United States Patent
Kenealy et al.

(10) Patent No.: US 9,065,555 B2
(45) Date of Patent: Jun. 23, 2015

(54) METHOD OF CHANNEL ESTIMATION AND A CHANNEL ESTIMATOR

(71) Applicant: Intel Mobile Communications GmbH, Neubiberg (DE)

(72) Inventors: Scott Kenealy, Neubiberg (DE); Clemens Buchacher, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 92 days.

(21) Appl. No.: 13/628,690

(22) Filed: Sep. 27, 2012

(65) Prior Publication Data

US 2014/0086373 A1 Mar. 27, 2014

(51) Int. Cl.
| | |
|---|---|
| *H04L 27/06* | (2006.01) |
| *H04B 17/00* | (2015.01) |
| *H04L 25/02* | (2006.01) |
| *H04L 27/00* | (2006.01) |
| *H04J 11/00* | (2006.01) |

(52) U.S. Cl.
CPC .............. *H04B 17/00* (2013.01); *H04L 25/02* (2013.01); *H04L 27/00* (2013.01); *H04J 11/0063* (2013.01); *H04L 25/0212* (2013.01); *H04L 25/0224* (2013.01); *H04L 25/0256* (2013.01)

(58) Field of Classification Search
CPC ................ H04L 25/021; H04L 2025/03414; H04B 7/0413
USPC .................... 375/340, 232; 455/561, 456, 65; 370/210, 252; 342/387
See application file for complete search history.

(56) References Cited

U.S. PATENT DOCUMENTS

| | | | | |
|---|---|---|---|---|
| 6,219,561 | B1* | 4/2001 | Raleigh | 455/561 |
| 2005/0281324 | A1* | 12/2005 | Wallen | 375/148 |
| 2008/0212666 | A1* | 9/2008 | Kuchi et al. | 375/231 |
| 2009/0201206 | A1* | 8/2009 | Li et al. | 342/373 |
| 2011/0194402 | A1* | 8/2011 | Sherman et al. | 370/210 |
| 2012/0094618 | A1* | 4/2012 | Harada et al. | 455/84 |
| 2013/0030771 | A1* | 1/2013 | Joseph | 703/1 |
| 2013/0176174 | A1* | 7/2013 | Annavajjala et al. | 342/387 |
| 2013/0322584 | A1* | 12/2013 | Kumar | 375/349 |
| 2014/0074397 | A1* | 3/2014 | Vanderwerf | 701/472 |

OTHER PUBLICATIONS

Ilan Ziskind, et al.; "Maximum Likelihood Localization of Multiple Sources by Alternating Projection", IEEE Transactions on Acoustics, Speech, and Signal Processing, vol. 36, No. 10, Oct. 1988, p. 1553-1560.

(Continued)

*Primary Examiner* — Sam K Ahn
*Assistant Examiner* — Fabricio R Murillo Garcia
(74) *Attorney, Agent, or Firm* — Eschweiler & Associates, LLC

(57) ABSTRACT

A method includes receiving a signal over a multi-path channel, generating a plurality of observation vectors of the received signal, generating a channel covariance matrix of the plurality of observation vectors, and identifying a first path by projecting a pulse shaping vector on the channel covariance matrix at different time offsets and selecting the maximum thereof as the first path. Thereafter, further paths can be identified. In each case, an n-th path is identified by projecting the pulse shaping vector into a null space of n-1 previously identified paths at different time offsets and the maximum thereof is selected as an n-th path.

27 Claims, 6 Drawing Sheets

(56) References Cited

OTHER PUBLICATIONS

Ralph O. Schmidt; "Multiple Emitter Location and Signal Parameter Estimation"; IEEE Transactions on Antennas and Propagation, vol. AP-34, No. 3, Mar. 1986, p. 276-280.

Seong Keun Oh, et al.; "A Sequential Estimation Approach for Performance Improvement of Eigenstructure-Based Methods in Array Processing", IEEE Transactions on Signal Processing, vol. 41, No. 1, Jan. 1993, p. 457-463.

* cited by examiner

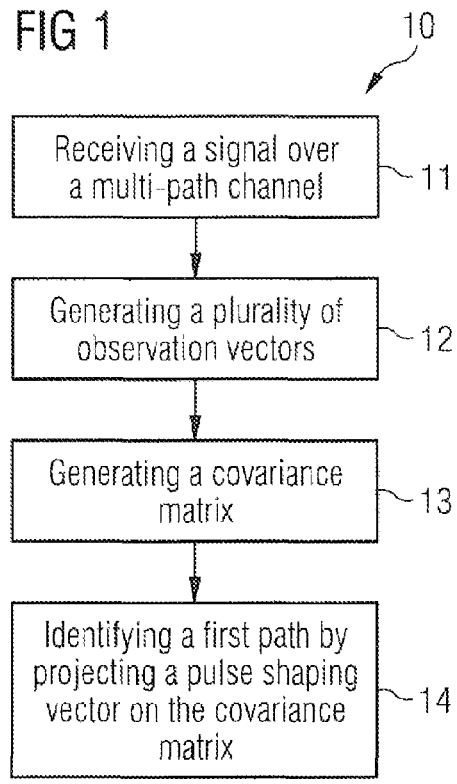
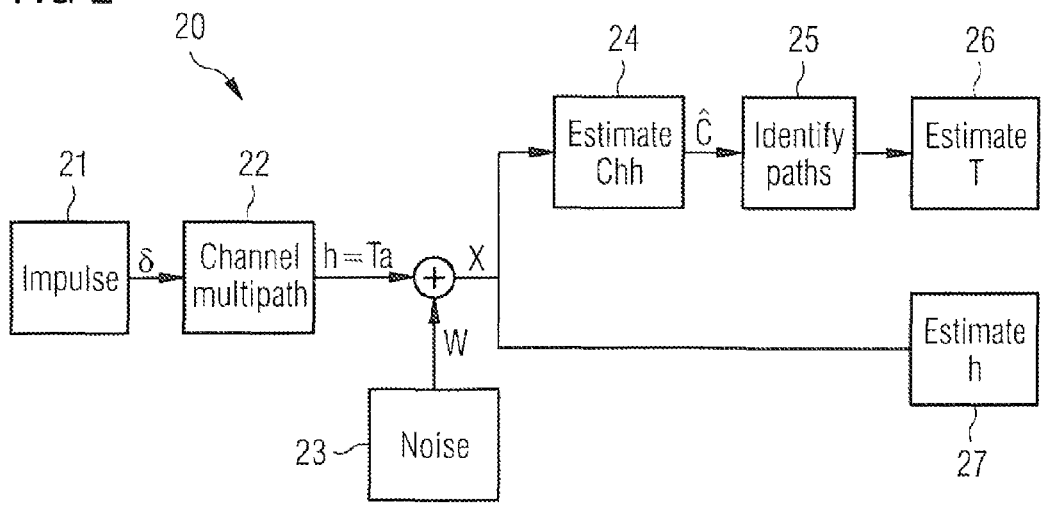

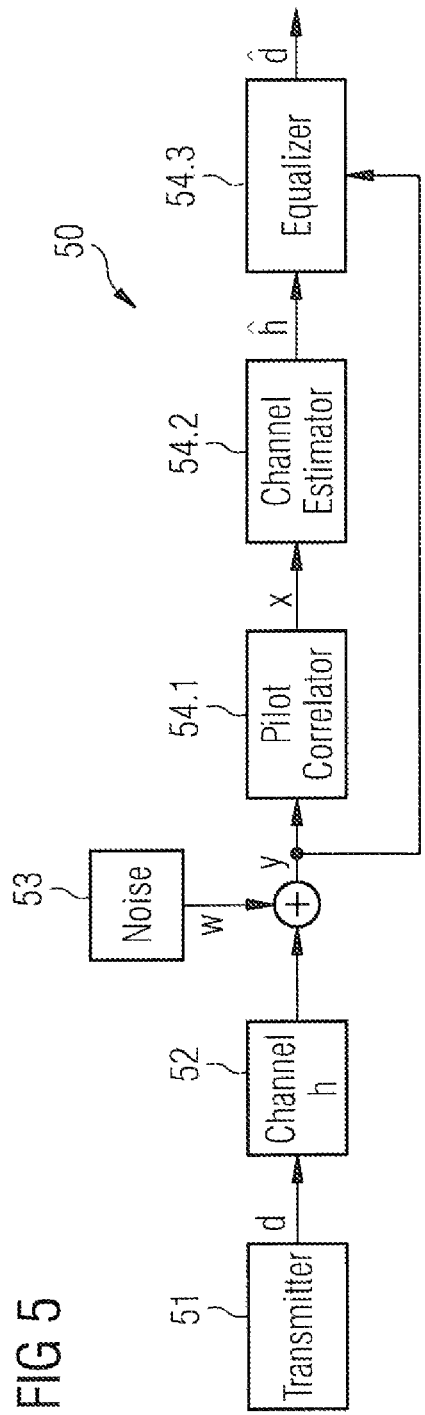

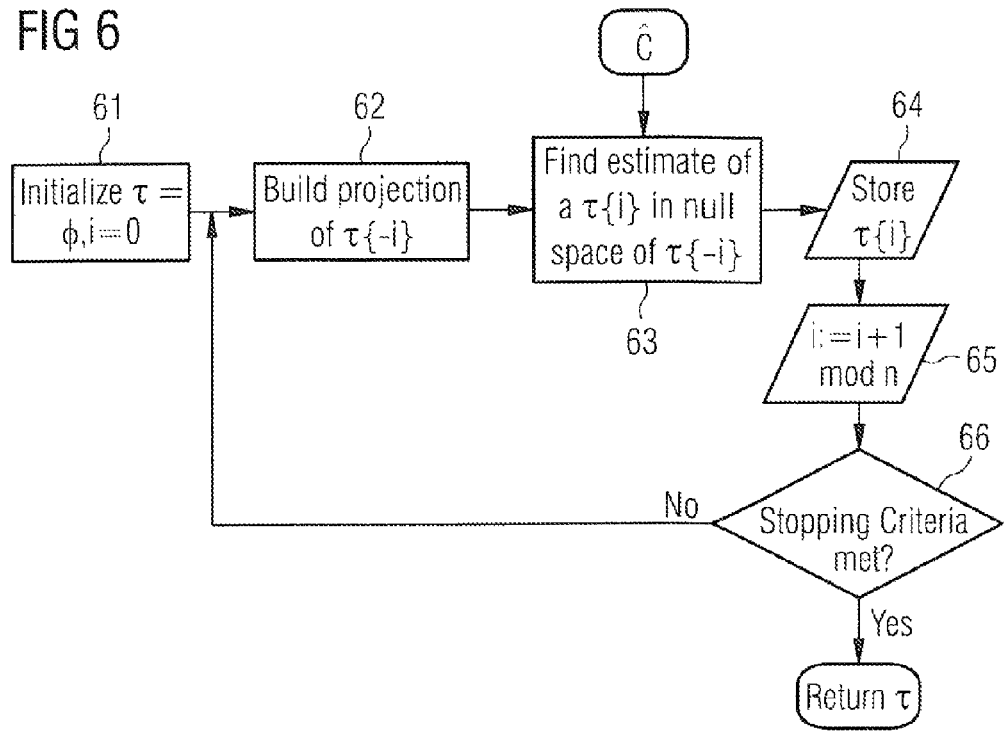
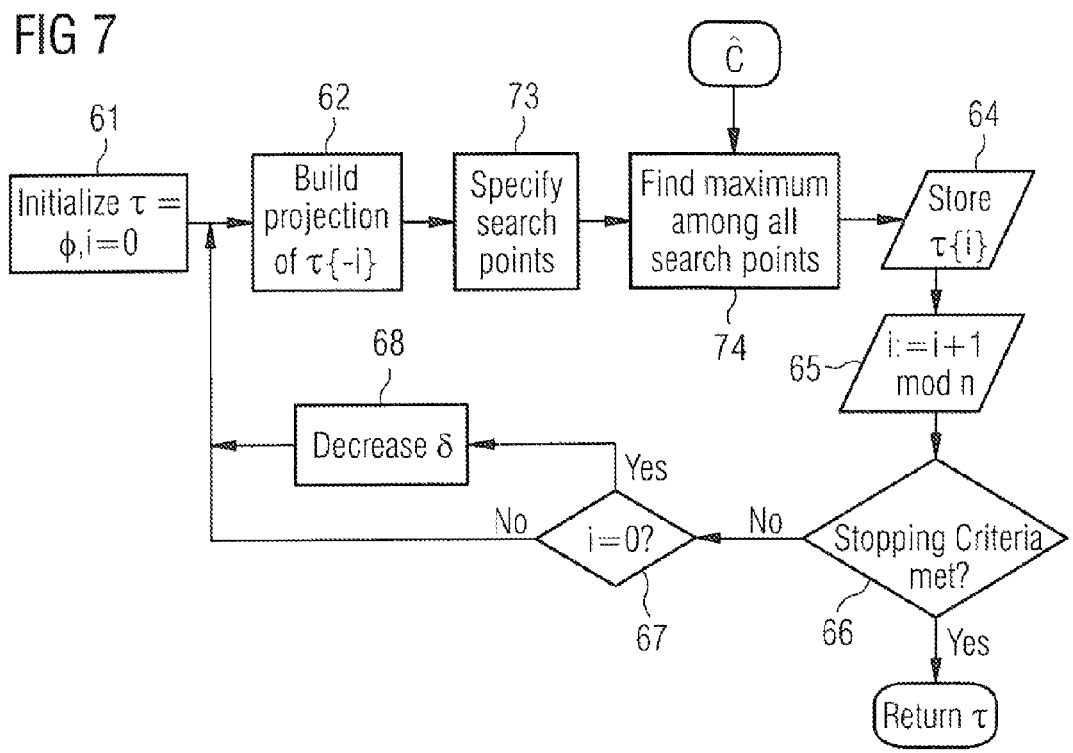

METHOD OF CHANNEL ESTIMATION AND A CHANNEL ESTIMATOR

FIELD

The present disclosure relates to a method of channel estimation and to a channel estimator.

BACKGROUND

Wireless radio transmission systems can be configured on the basis of transmitters and receivers capable of transmitting and receiving modulated data signals in the form of, for example, single carrier or multiple carrier data signals. One example of a multiple carrier radio transmission system is Orthogonal Frequency Division Multiplexing (OFDM) in which an OFDM transmitter broadcasts information consisting of symbols containing a plurality of equally spaced carrier frequencies. The characteristics of the wireless communication channel typically vary over time due to changes in the transmission path. For demodulating OFDM modulated data in the presence of substantial time variations of the transmission channel, knowledge of the transmission channel frequency response is required. This necessitates that the receiver provides an appropriate channel estimate of the transmission channel.

In wireless radio transmission systems a transmitted signal reaches a receiver after propagation through a wireless communication channel. In the propagation channel, the transmitted signal interacts with the environment in a very complex way. The signal propagation through a wireless communication channel causes various types of impairment in a received signal due to reflections from large obstacles, diffraction around smaller objects and edges, and refraction through the medium and signal scattering. These complex interactions result in reception of multiple delayed versions or replicas of the transmitted signal through multiple paths with each version having randomly distributed amplitude and phase. In general, a channel is known to experience a delay spread or a time dispersion due to multiple paths and is referred to as a multipath fading channel.

Multipath fading may cause errors in signal decoding due to inter-symbol-interference (ISI) and may further affect the performance of communication systems. Therefore, the delay spread is considered to be one of the important characteristics of propagation channels since it affects the performance of the communication systems. However, an even more important characteristic of the propagation channel is the exact placement of the delays within the window. Therefore the knowledge about the delay paths of a channel can thus be used for designing a better receiver structure which can adapt itself to deal with the changing nature of the underlying channel and provide an improved performance that enhances the user experience.

Conventional methods for delay estimation and path finding are not able to achieve the necessary time resolution which means that paths which are relatively near to each other in time cannot be resolved in time in a satisfying way. Other known methods may be able to reach a satisfying time resolution but may require optimization in dimensions on the order of the number of paths which could mean, for example, a 6-dimensional optimization problem which would require a large computational complexity.

BRIEF DESCRIPTION OF THE DRAWINGS

The accompanying drawings are included to provide a further understanding of aspects of the disclosure and are incorporated in and constitute a part of this specification. The drawings illustrate aspects and together with the description serve to explain principles of aspects. Other aspects and examples and many of the intended advantages of aspects and examples will be readily appreciated as they become better understood by reference to the following detailed description. Like reference numerals designate corresponding similar parts.

FIG. 1 illustrates a flow diagram of an exemplary method of channel estimation.

FIG. 2 illustrates a schematic block representation for illustrating an exemplary method of channel estimation.

FIG. 5 illustrates a system model including a schematic block representation of an exemplary combined channel estimator and equalizer, the channel estimator comprising a pilot correlator.

FIG. 6 illustrates a flow diagram of an exemplary method of identifying paths in a multipath signal.

FIG. 7 illustrates a flow diagram of an exemplary method of identifying paths in a multipath signal.

DETAILED DESCRIPTION

Figure 3:
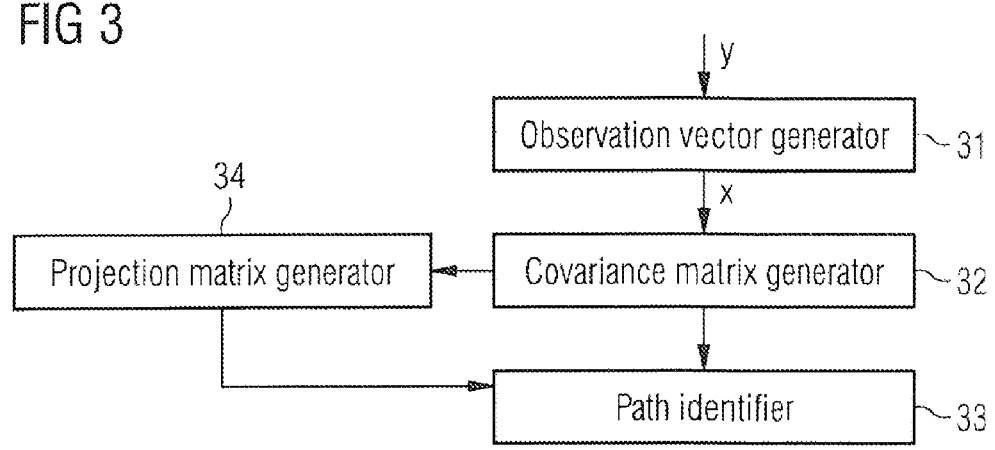
FIG. 3 illustrates a schematic block representation of an exemplary channel estimator.

The aspects and examples are described with reference to the drawings, wherein like reference numerals are generally utilized to refer to like elements throughout. In the following description, for purposes of explanation, numerous specific details are set forth in order to provide a thorough understanding of one or more aspects or examples. It may be evident, however, to one skilled in the art that one or more aspects or examples may be practiced with a lesser degree of the specific details. In other instances, known structures and elements are shown in schematic form in order to facilitate describing one or more aspects or examples. It is to be understood that other examples may be utilized and structural or logical changes may be made without departing from the scope of the disclosure.

In addition, while a particular feature or aspect of an example may be disclosed with respect to only one of several implementations, such feature or aspect may be combined with one or more other features or aspects of the other implementations as may be desired and advantageous for any given or particular application. Furthermore, to the extent that the terms "include", "have", "with" or other variants thereof are used in either the detailed description or the claims, such terms are intended to be inclusive in a manner similar to the term "comprise". The terms "coupled" and "connected", along with derivatives may be used. It should be understood that these terms may be used to indicate that two elements co-operate or interact with each other regardless whether they are in direct physical or electrical contact, or they are not in direct contact with each other. Also, the term "exemplary" is merely meant as an example, rather than the best or optimal. The following detailed description, therefore, is not to be taken in a limiting sense, and the scope of the present invention is defined by the appended claims.

The apparatuses and methods as described herein are utilized as part of and for radio transmission systems, for example for systems operating according to anyone of the mobile communication standards like the GSM standard, the EDGE standard, the UMTS standard or the Long Term Evolution (LTE) Standard. The following description may thus be read in connection with any kind of carrier radio transmission systems, such as those implemented in one or more of these standards and also, for example, for systems operating in the Orthogonal Frequency Division Multiplex (OFDM) mode. The apparatuses disclosed may be embodied in baseband segments of devices used for the transmission or reception of radio signals generated according to one or more of these standards, in particular base stations, relay stations, mobile phones, hand-held devices or other kinds of mobile radio receivers. The described apparatuses may be employed to perform methods as disclosed herein, although those methods may be performed in any other way as well.

The following description may also be read in connection with multiple carrier radio transmission systems in the field of digital video broadcasting (DVB-T/H) which is based on terrestrial transmitters and a communication system design adapted for mobile or hand-held receivers. However, also other communications systems, for example, satellite OFDM systems, may benefit from the concepts and principles outlined herein.

The methods and apparatuses as described herein may be utilized with any sort of antenna configurations employed within the multiple carrier radio transmission system as described herein. In particular, the concepts presented herein are applicable to radio systems employing an arbitrary number of transmit and/or receive antennas, that is Single Input Single Output (SISO) systems, Single Input Multiple Output (SIMO) systems, Multiple Input Single Output (MISO) systems and Multiple Input Multiple Output (MIMO) systems.

FIG. 1 illustrates a flow diagram of an exemplary method of channel estimation. The method 10 shown in FIG. 1 comprises receiving a signal over a multi-path channel (11), generating a plurality of observation vectors of the received signal (12), generating a channel covariance matrix of the plurality of observation vectors (13), and identifying a first path by projecting a pulse shaping vector on the channel covariance matrix at different time offsets and selecting the maximum thereof as the first path.

Following the identifying of the first path, a second path and possible further paths can be identified. In order to make this more clear, reference is made to FIG. 2 which illustrates a schematic representation for illustrating an exemplary method of channel estimation.

At first it is assumed that in a transmitter a pulse shaping filter forms an impulse 21, wherein the impulse 21 is assumed to have a raised cosine pulse shape. An antenna of the transmitter radiates the impulse 21 into a multipath channel 22. The multipath channel 22 is assumed to have n unique paths with delays $\tau_1, \tau_2, \ldots, \tau_n$ where $|\tau_i-\tau_j|>\epsilon, \forall\ i,j:i\neq j$ wherein $\epsilon$ is a minimum separation distance, i.e. no two of these paths arrive at a receiver at the exact same time. Further, the channel observation window uses m samples, and the receiver may also include a pulse-shaping filter which is a known component of the receiver system, leading to a uniquely-defined m-vector $r(\tau_i)$ containing a sampled version of this pulse-shape.

The following channel model can be used:

$$x=h+w \quad (1)$$

where x is an observation vector, h is the true channel vector which is to be estimated, and block 23 represents the noise resulting in a noise vector w. The channel vector h itself is generated by h=T$\alpha$, where T=[$\beta_1 r(\tau_1)\ \beta_2 r(\tau_2) \ldots \beta_n r(\tau_n)$] and is deterministic, $\beta_i$ represents the average amplitude of path i and $r(\tau_i)$ is a column vector containing the sampled pulse-shaping filter, offset by delay $\tau_i$. Meanwhile, $\alpha$ is a stochastic column vector in which each element $\alpha_i$ holds the instantaneous phase and fading information, which is assumed to change at every observation. It is assumed that elements of $\alpha$ are independent from each other and independent across observations, also known as the Uncorrelated Scattering model and implying a diagonal covariance matrix $C_{\alpha\alpha}$, and we further model $C_{\alpha\alpha}=I_n$. Our specification of h=T$\alpha$ allows us to assume that this is the identity even if physical conditions do not directly match the assumptions, as it simply results in a transformed, but equivalent, model.

Generating each one of the plurality of observation vectors may comprise sampling and quantizing the received signal to obtain a plurality of digital values and then correlating the signal. In CDMA the received signal is coded with a known channelization code, also called spreading code, and possibly also with a known scrambling code. Correlating the signal can be done, for example, by multiplying the signal with the spreading code and, if necessary, also with the scrambling code. It is also possible that before sampling, the signal is filtered with an input filter like, for example, a pulse shaping filter. The pulse shaping filter can be a Raised Cosine or Root Raised Cosine filter.

Given a series of past observations $x_1, x_2, \ldots, x_n$, in block 24 an estimate of $C_{hh}$ is generated which is the covariance matrix of the noiseless channel (channel covariance matrix). This can be done by generating the noisy channel covariance in the maximum-likelihood fashion:

$$\hat{C}_{xx} = \frac{1}{n}\sum_{i=1}^{n} x_i x_i^H \quad (2)$$

and then setting $\hat{C}_{hh}=\hat{C}_{xx}-\hat{C}_{ww}$, wherein $\hat{C}_{xx}$, $\hat{C}_{hh}$, and $\hat{C}_{ww}$ denote the estimates of the covariance matrix of the noisy observation x, the desired channel h, and the noise vector w, respectively wherein $\hat{C}_{ww}$ can be estimated using classical methods like, for example Kalman filtering or maximum likelihood estimation. Other methods are available for generating $\hat{C}_{hh}$, although the above algorithm does not depend on the specifics of the estimation in general, and this method is presented as one of many possible methods.

In the next step the paths will be identified in block 25. In the case where only one path exists with unknown delay, the maximum likelihood estimate of the delay $\tau$ is given by $$\tau_1=\arg\max_\tau r(\tau)^T \hat{C}_{hh} r(\tau) \quad (3)$$

so that the pulse shaping vector is found at offset $\tau$ which provides the largest projection of the covariance matrix, and thus describes the largest part of the signal.

Now it is assumed that 2 paths are found instead of just the one. One approach would be to simply try to find a second peak in the optimization problem. If the two delays are fairly close (depending on the pulse-shaping filter's autocorrelation function), however, the second path's peak could be drowned out by the first path's peak. Thus, the already-found first path's peak can be canceled out by only looking in the space which is orthogonal to the already-found first path's peak.

Thus, a projection matrix is given by:

$$P=I_m-r(\tau_1)r(\tau_1)^T \quad (4)$$

which allows to search for parts of the signal which are not at all represented by the already-found first path. To find the second tap, one may use a modified version of the optimization problem:

$$\tau_2 = \underset{\tau}{\operatorname{argmax}} tr\{r_p(\tau)r_p(\tau)^T \tilde{C}_{hh}\} \quad (5)$$

$$\text{where } r_p(\tau) = \frac{Pr(\tau)}{\|Pr(\tau)\|_2} \quad (6)$$

This function to be maximized can be called the projected energy function. tr{X} is the trace of the matrix X.

For the case of even more paths, this procedure can be repeated, except to specify P to project into the null space of all previously-found delayed paths rather than simply the first one. In particular, the n-th path could be identified by the following equation:

$$\tau_n = \underset{\tau}{\operatorname{argmax}} tr\{r_p(\tau)r_p(\tau)^T \tilde{C}_{hh}\} \quad (7)$$

wherein tr{X} is the trace of the matrix X, and $$P = I_m - R(R^T R)^{-1} R^T \quad (8)$$

wherein $$R = [r(\tau_1) r(\tau_2) \ldots r(\tau_{n-1})] \quad (9)$$

wherein
$r(\tau_1), r(\tau_2), \ldots r(\tau_{n-1})$ are the pulse shaping vectors at time offsets $\tau_1, \tau_2, \ldots \tau_{n-1}$, $I_m$ is the identity matrix.

It should be noted that the projector according to Eq. (8) is a generalized form of the projector of Eq. (4) in case of projecting into the null space of n-1 previously identified delay paths. Accordingly the projector of Eq. (8) can also be used for identifying the second path and there is in principle no difference between identifying the second path and all further paths.

Figure 9:
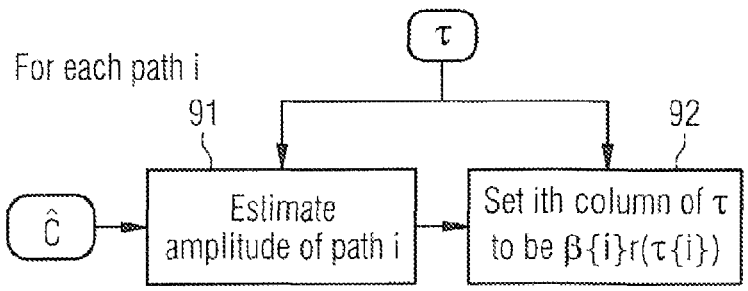
FIG. 9 illustrates a flow diagram of an exemplary method of estimating the amplitudes of the identified paths.

Once the delays have been estimated, the average amplitudes of each path may be found via projections of the pulse shape onto the multi-path channel covariance matrix as is illustrated in FIG. 9. The amplitudes and delays will be calculated in block 26 and will uniquely define T wherein in block 91 τ is projected on the multi-path covariance matrix estimate as estimated so far and in block 92 the i-th column of T is set to be β{i}r(τ{i}). It has been found, however, that once SNRs are reasonably high, it is also possible to skip estimating the amplitudes, as setting every amplitude to 1 only slightly increases the error in ĥ.

Once T has been estimated in block 26, in block 27 the standard MMSE formula can estimate h:

$$\hat{h} = T(I_n + T^H C_{ww}^{-1} T)^{-1} T^H C_{ww}^{-1} x \quad (10)$$

For the case of white Gaussian noise with power $\sigma^2$.

FIG. 3 shows a schematic block representation of an exemplary channel estimator. The channel estimator 30 of FIG. 3 comprises an observation vector generator 31 configured to generate a plurality of observation vectors of a received signal. The observation vector generator 31 comprises an input for a received signal and an output which is connected to a channel covariance matrix estimator 32. The channel covariance matrix estimator is configured to generate a channel covariance matrix estimate from the plurality of observation vectors. A first output of the channel covariance matrix estimator 32 is connected with a first input of a path identifier 33 which is configured to identify a first path by projecting a pulse shaping vector on the channel covariance matrix estimate at different time offsets and to select the maximum thereof as the first path. The delay path estimator 30 may further comprise a projection matrix generator 34 an input of which is connected with a second output of the covariance matrix estimator 32 and an output of which is connected with a second input of the path identifier 33. The projection matrix generator 34 is configured to generate a projection matrix being orthogonal to the first path. All units 31-34 of the delay path estimator 30 may be further configured to carry out the method as described above, in particular by implementing one or more of the above equations (1) to (10).

The path identifier 33 may be further configured to identify a second path by projecting the pulse shaping vector into a null space of the first path at different time offsets and to select the maximum thereof as a second path. In particular, the projection matrix generator 34 may be configured to generate a projection matrix being orthogonal to the first path, in particular by making use of the above equations (4) to (6).

The path identifier 33 may be configured to identify further paths and further to identify an n-th path by projecting the pulse shaping vector into a null space of n-1 previously identified paths at different time offsets and to select the maximum thereof as an n-th path, in particular by making use of the above equations (7) to (9). In particular, the projection matrix generator 34 may be further configured to generate a projection matrix being orthogonal to the n-1 previously identified paths.

The path identifier 33 may be further configured to conduct one or more of the first step and the second step by applying a logarithmic search.

The path identifier 33 may be further configured to determine amplitudes of the identified paths by projecting the pulse shaping vector on a multi-path channel covariance matrix containing all identified paths.

Figure 4:
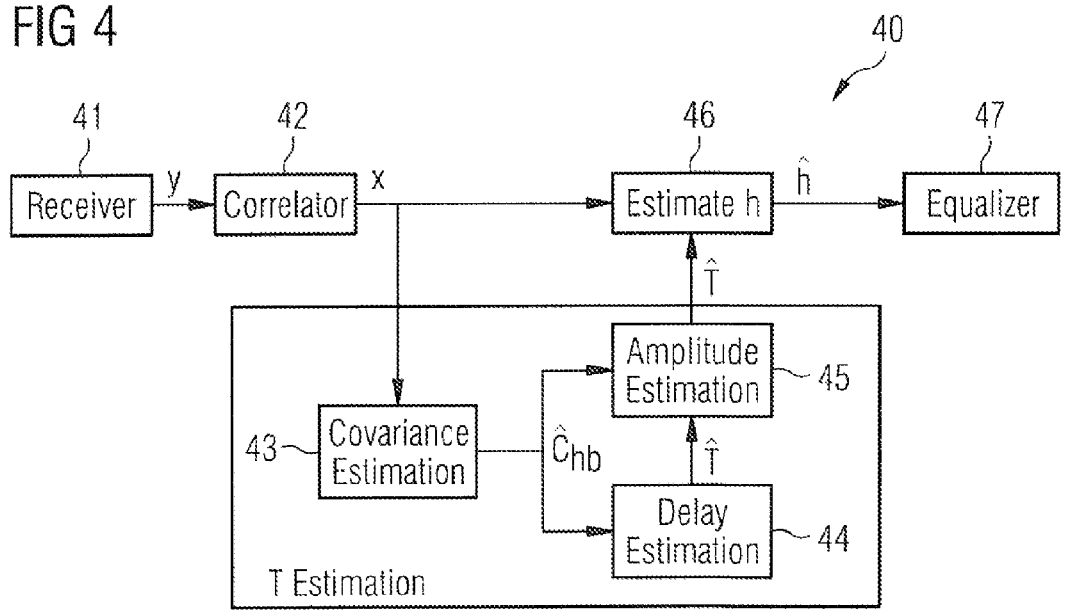
FIG. 4 illustrates a schematic block representation of an exemplary combined channel estimator and equalizer, the channel estimator comprising a correlator.

FIG. 4 illustrates an example of a combined channel estimator and equalizer according to the disclosure. The channel estimator 40 of FIG. 4 comprises a so-called receiver 41 which may comprise an input filter like that described above and a sampling and digitizing unit to generate digital values in the form of a vector y. The output of the receiver 41 is supplied to a correlator 42, which multiplies the digital signal values with a known spreading code and, if necessary, also with a known scrambling code to generate an observation vector x. The correlator 42 may correspond to the observance vector generator 31 of FIG. 3. The observation vectors x are then supplied to the covariance estimator 43 to generate a covariance matrix therein. The covariance estimator 43 may correspond to the covariance matrix generator 32 combined with the projection matrix generator 34 of FIG. 3. The covariance matrix $C_{hh}$ generated by the covariance estimator 43 is then supplied to a delay estimator 44 to identify the delay paths of the received signal. The delay estimator 44 may correspond to the path identifier 33 of FIG. 3. The set of identified delay paths estimated by the delay path estimator 44 are supplied to the amplitude estimator 45 to estimate the amplitudes of each one of the estimated delay paths. The amplitude estimator 45 may be configured to estimate T by estimating the average amplitudes of each path via projections of the pulse shape onto the multi-path channel covariance matrix as was explained above in connection with block 26 of FIG. 2. The estimated T is supplied to a channel estimator 46 in which h is estimated according to block 27 of FIG. 2 and one of equations (11) or (12). The channel estimator 46 may comprise two inputs one of which being connected with an output of the correlator 42 and the other one of which being connected with an output of the amplitude estimator 45. The channel estimator 46 may include an MMSE estimator. The estimated h can be output by the channel estimator 46 to an equalizer 47 in which the data can be equalized. It is also possible to supply the delay paths and the amplitudes to the equalizer 47, either in place of or in addition to the estimate of h.

In general, the observation vector x can be generated from data signals or pilot signals. In CDMA, for example, a correlator may be used for correlating over the data channel or the pilot channel. Thus in the latter case a pilot correlator can be used to process the received signal first, which correlates over the pilot channel. In this example the output of this pilot correlator is the observation vector x=h+w which was already mentioned above.

It is assumed that y is the received signal, containing the chipped data of all channels, including the pilot. By correlating y with a given chipping sequence (the above-mentioned spreading code or channelization code), we get x=hs+w, where s is the data symbol on that channel corresponding to the chipping sequence used. If one uses the pilot channel chipping sequence for correlation, it is known that s is 1, so the received sequence is x=h+w, as it is used for the algorithm.

It is noted that the estimation takes two steps. First, T is estimated using the delay estimation as described above as well as an amplitude estimator, then the current h is estimated from the current x using this estimation of T. T is the long term parts of the channel that are present over many realizations of h and phase independent, so it may be estimated separately, as information on it will be present in all observations x (at least for a long time). Meanwhile, h is the product of both slow and fast changes, so the current realization of h can only be estimated from the current realization of x.

For building the covariance matrix, it would be possible to use a channel other than the pilot channel under certain conditions. For example, if the symbol transmitted used a PSK (phase shift keying) modulation scheme, the observation x could still be used to build the covariance matrix. T is estimated only from the covariance matrix. Thus, estimation of T does not explicitly require pilot symbols, as long as a data channel is known to use certain modulation schemes which would work. T alone is useful information, and many methods exist only to estimate T.

Once T is estimated, the symbol s must be known in order to estimate h. In the simplest case, this could be a pilot symbol. However, if s is a data symbol which could be known reasonably well via some other means, it would theoretically be possible for the algorithm to work without a pilot sequence. Estimating s without knowing the channel is within the knowledge of the skilled person.

FIG. 5 illustrates an example of a system model showing in the right-hand half an example of a combined channel estimator and equalizer according to the disclosure. The channel estimator 50 of FIG. 5 shows a transmitter 51 which transmits a signal d into a channel 52 in which the signal will be distorted and where also noise 53 contributes to the signal distortion. The signal y is received by a receiver which includes a combined channel estimator and equalizer 54. The combined channel estimator and equalizer 54 includes a pilot correlator 54.1, a channel estimator 54.2 and an equalizer 54.3. The structure of the pilot correlator 54.1 may correspond to that one of the correlator 42 of FIG. 4 whereas the pilot correlator 54.1 may be intended to correlate only pilot symbols so that in this case the observation vectors x may be generated only on the basis of correlated pilot symbols. The channel estimator 54.2 may correspond to blocks 43 to 46 of FIG. 5 so that the channel estimator 54.2 may also include a covariance estimator, a delay estimator, an amplitude estimator and a channel estimator. The equalizer 54.3 may correspond to the equalizer may correspond to the equalizer 47 of FIG. 4.

Referring to FIG. 6, a flow diagram is shown for illustrating an exemplary method of identifying paths in a multipath signal as is done, for example, in block 25 of FIG. 2. In this flow diagram ti is an ordered set of path delays, $\tau\{i\}$ is the i-th value of $\tau$ and $Y\{-i\}$ means all values in $\tau$ except the i-th. In block 61 an initialization is done where $\tau$ is set to an empty set and i is set to zero. Then in block 62 a projection of $\tau\{-i\}$ is built. In block 63 an estimate of $\tau\{i\}$ in a null space of $\tau\{-i\}$ is found wherein the covariance matrix estimate is supplied to block 63. In block 64 the obtained value of $\tau\{i\}$ is stored. In block 65 the parameter i is increased by 1 observing the value of i modulo n, i.e. the modulo n resets i to 0 when i reaches n. Then in block 66 it is checked whether one or more specified stopping criteria are met. The algorithm works with a number of repetitions, that is find the values of $\tau\{i\}$ for i=0 . . . n-1, then re-estimate the values again and overwrite the old values. The stopping criterion can be, for example, a pre-defined number of repetitions. Another possibility of a stopping criterion is not to pre-define the number of repetitions but to check whether the values of $\tau\{i\}$ remain fairly constant. Anyway, if the answer is "NO" a next repetition is performed and if the answer is "YES" the flow is stopped.

The method described so far assumed constant time resolution when projecting the pulse shape on the covariance matrix with different time offsets. With this a relatively high resolution of the identified paths can be achieved. However, the raised cosine (or similar) autocorrelation may be significant at various delay offsets, and so the first paths found might be "pulled" toward the remaining paths. At best, delay taps will be estimated close to their actual values after one pass. However, it is not uncommon in such a situation for enough power to remain from a close but not perfect estimate that a later path is estimated near the already estimated path. In general, the method described so far might not achieve the desired accuracy when delays are very close to each other. In the following it will be shown how the resolution of the identified paths can be further improved.

As was already explained in connection with FIG. 6, each path may be estimated several times thereby making it possible to exploit the later-found taps to "do-over" the early estimations, usually resulting in better estimates overall. For example, once n paths have been estimated, one might go back to the first path and build a projection into the null space of all paths except the first path, and re-estimate this delay and continue on re-estimating all other delays. The first estimation pass can be done estimating all path delays which one wants to find at the end of the whole procedure and the second pass can be done by re-estimating the same path delays again (this might be denoted as 1234-1234). However, it is not necessary to find all paths in the first estimation pass before performing re-estimating in the second pass. One may find the first two paths in the first estimation pass, then perform the second estimation pass by re-estimating the first path given the additional estimate of the second path as known from the first pass and improve the accuracy of the first path before moving on to find the third (this might be denoted as 12-123). It is also possible to increase the number of paths from one pass to the next which might be denoted as 12-123-1234.

When estimating the path delays, projections of the pulse shape on the covariance matrix estimate are formed by adjusting different delay offsets of the pulse shape thereby virtually shifting the pulse shape over the covariance matrix estimate.

The delay span between adjacent or neighboring time offsets tested represents the time resolution of the pass. It is possible to use equal time resolutions for first and second estimation passes. However, it might be advantageous to use different time resolutions. In particular, the first pass might be performed with a relatively low time resolution and the second pass might be performed with a relatively high time resolution. It is also possible to perform more than two passes, whereby the first pass is performed with a low time resolution, the second pass is performed with a medium time resolution, and the third pass is performed with a third high time resolution. It is even possible to employ more than three passes with different time resolutions.

Accordingly in the channel estimator 30 of FIG. 3, the path identifier 33 may be configured in a first step to identify the first path and the second path by projecting the pulse shape on the covariance matrix in a first scan, and thereafter in a second re-estimation step to again identify the first path and further paths by projecting the pulse shaping vector into a null space of the identified second path in a second scan. In particular, the path identifier may be configured in a first step to identify the first path and further paths and thereafter in a second step to identify the first path and further paths by projecting the pulse shaping vector into a null space of all other identified paths. But if two scan are being performed, then in the first scan it may be sufficient to find only the first and second paths and then immediately conduct the second scan.

The path identifier 33 may be further configured to conduct the first scan with a first time resolution and to conduct the second scan with a second time resolution, wherein the first time resolution is lower than the second time resolution. It may be further configured to conduct a first scan with a first low time resolution, then a second scan with a medium time resolution, and then a third scan with a third high time resolution.

This could also be written down in short form as follows wherein the steps are conducted in this order (so-called interleaved order):

Low Res $\tau_1$
Low Res $\tau_2$
(... ... ..
... ... ..
Low Res $\tau_n$)
Medium Res $\tau_1$
Medium Res $\tau_2$
... ... ..
... ... ..
Medium Res $\tau_n$
High Res $\tau_1$
High Res $\tau_2$
... ... ..
... ... ..
High Res $\tau_n$ wherein, for example, Low Res $\tau_1$ means a scan with a low time resolution for identifying a first path $\tau_1$.

Another example would be as follows wherein the steps are conducted in this order (so-called alternate order or alternate projection):

Low Res $\tau_1$
Medium Res $\tau_1$
High Res $\tau_1$
Low Res $\tau_2$
Medium Res $\tau_2$
High Res $\tau_2$
... ... ..
... ... ..
Low Res $\tau_n$
Medium Res $\tau_n$
High Res $\tau_n$ For both interleaved and alternate orders a complete algorithm will also be sketched below.

The pulse shape used can be a raised cosine, a triangle or a sinc wave. Depending on the pulse shape used by the system, optimization may be cumbersome in closed form, so that it may be also considered to conduct the scan in the form of a search. In practice, the search may cover the entire estimation window, which can be relatively large (the estimation window can be 10000 times the size of the desired resolution). Thus, a logarithmic search can be used which can considerably speed up the search.

The logarithmic search can, for example, be conducted in the form of the bisection search method. The bisection search method in mathematics is a root-finding method which repeatedly bisects an interval and then selects a subinterval in which a root must lie for further processing. In general, a logarithmic search may consist of a low-resolution global search, followed by one or more local searches of increasing resolution.

According to another example, it is also possible to generate a small number of points, perhaps 12 or so, but dependent on factors such as the window size and pulse shape, and distribute these equally across the estimation window. Then, the projected energy function specified earlier for each of these points (taking into account any previously-estimated delays) can be calculated and the largest picked or selected. This is repeated for the remaining n-1 delays. For each path $\tau_i$, one can now decrease the search space from the entire window to $(\tau_i-\delta, \tau_i+\delta)$ for some $\delta$ which will depend on the estimation problem specifics, and once again distribute several points (the exact number again dependent on the problem specifics) equally across this window, then calculate the projected energy function at these points, then overwrite $\tau_i$ with the new best point. In this way one can continually find all n points and then decrease the span of the search space while increasing the resolution of the search until a desired degree of accuracy has been reached.

In the above-described search it is also possible to ignore points which are closer than $\epsilon$ to any other $\tau_j$ currently in use. Furthermore, because dense delays will attempt to "pile up" on the same point at low resolutions and thus be forced to choose another point, the resolution should always be high enough and the span should be wide enough so that the projected likelihood function will have some point which is a maximum among all valid points (those not within $\epsilon$ of another in-use delay) which is still within $\delta$ of the true point. These factors are limited by the autocorrelation of the pulse shape and the number of delays to estimate.

The logarithmic search has two advantages. First, it is a computationally efficient search, much faster than a linear search. Second, it allows us to interleave estimates of delays, and so the extra repetition is not necessary. The interleaving means that every delay estimation past the first few low-resolution steps of the logarithmic search will already use a rough estimate of the other delays, and so the repetition desired earlier is already integrated in the optimization process.

Referring to FIG. 7, a flow diagram is shown for illustrating an exemplary method of identifying paths in a multipath signal as is done, for example, in block 25 of FIG. 2. This flow diagram makes use of the logarithmic search algorithm described before. Those blocks having same or similar functionality as corresponding blocks of FIG. 6 have been designated with same reference signs. There are alternate or additional blocks in the flow diagram, namely block 53 in which search points are specified as was outlined above, block 54 in which the maximum among all search points is found, block 47 in which it is checked whether all paths have been identified in the previous pass so that i has been set to 0. If the answer is "YES" in block 48 the search window around each path is decreased. Then in the following pass, the paths are re-estimated with the reduced search window.

The following is a pseudocode for an algorithm of the interleaved order which may be used to implement a method as described above.

```
1. procedure
2.   τ_step ← step_1
3.   Points ← [τ_min : τ_step : τ_max]        → Low-resolution global search
4.   for i ← 1 ... n do
5.     P^⊥ ← NullProjection ([τ_1, τ_2, ... τ_i])
6.     τ_i ← Search (C_h, Points, P^⊥)
7.   end for
8.   for τ_step ← step_{2:end} do
9.     for i ← 1 ... n do
10.      Points [τ_i − k × τ_step : τ_step : τ_i + k × τ_step ]   →Increasing resolution local search
11.      P^⊥ ← NullProjection ([τ_1, τ_2, ..., τ_{i−1}, τ_{i+1}, ... τ_n])
12.      τ_i ← Search(C_h, Points, P^⊥)
13.    end for
14.  end for
15.  return [τ_1, τ_2, ... τ_n]
16. end procedure
```

Note:
[a:b:c] denotes the vector [a a + b a +2b ... a + kb] such that a + kb ≤ c.

The following are parameters which are determined elsewhere in the system:
$C_h$ is the Square matrix with dimension matching the channel length in samples. Estimate of channel covariance matrix, e.g. the sample covariance matrix.
n Positive scalar denoting number of paths to find. Should the system have no idea how many to find, it typically does not hurt results very much to overestimate.

The following are constants that can be "hardcoded" in silicon: $step_{init}$ Positive scalar denoting initial search resolution. Will depend on system, but relatively large.
$\tau_{min}$ Scalar denoting beginning of channel estimation window
$\tau_{max}$ Scalar denoting end of channel estimation window
Resolutions Vector of positive numbers denoting search step sizes for each search resolution. Begins with a large number, decreases to maximal search resolution.
k Positive scalar denoting how many steps from the local point to check.

Alternatively, the constants can also be adjusted "on the fly", i.e. when starting the estimation procedure.

Figure 8:
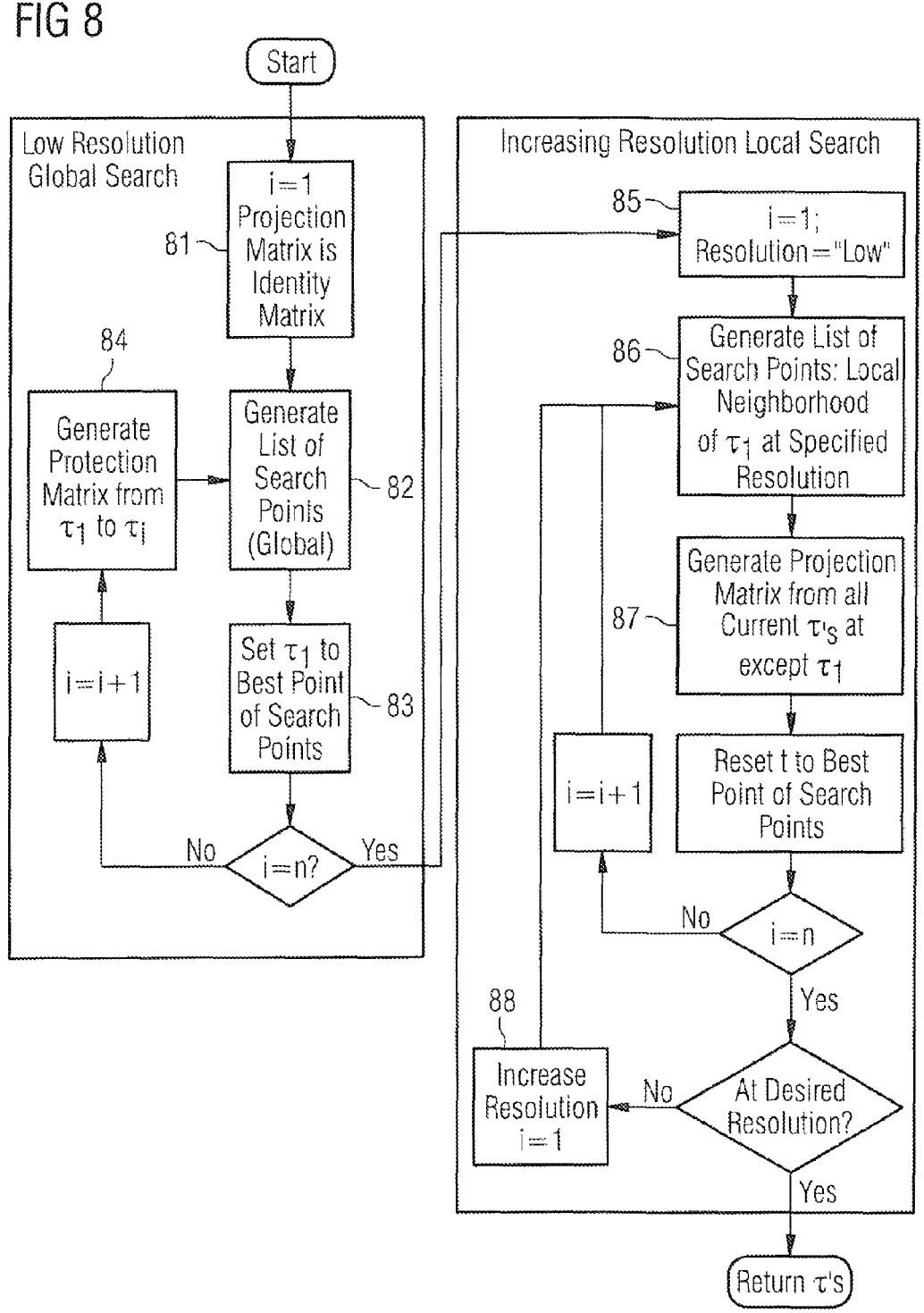
FIG. 8 illustrates a flow diagram of an exemplary method of identifying paths in a multipath signal.

The following are variables:
$\tau_i$ Scalar denoting current estimate of the i-th path's delay.
step Positive scalar denoting search step size. A large value corresponds to a low-resolution search, while a small value is high-resolution.
Points Set of points to search The algorithm of the interleaved order as outlined above can also be illustrated in the form of a flow diagram as shown in FIG. 8. In the flow diagram, at first a low resolution global search is performed wherein in box 81 for identifying the first delay path i is set to 1 and a starting projection matrix is set to the identity matrix. Then a list of Search Points, i.e. time offset values, in the whole observation window (global) is generated in box 82 which corresponds to line 3 of the above Pseudocode. In box 83 $\tau_i$ is set to the best point of the search points, in other words in the first pass for identifying $\tau_1$ Eq. (3) is calculated for each one of the time offset values of the search points and $\tau_1$ is set to the search point where the maximum is found. Then the index i is increased by 1 (in case i has not reached n), and then in box 84 a projection matrix from $\tau_1$ to $\tau_{i-1}$ is generated which corresponds to line 5. As soon as the index i has reached n, the flow moves to the increasing resolution local searches which corresponds to the transition between lines 7 and 8. At first in box 85, i is again set to 1 to again identify the first path and the starting time resolution is set "low" and will be increased in subsequent iterations. Then a list of search points in the neighborhood of $\tau_1$ with a specified resolution is generated in box 85 which corresponds to line 10. Thereafter in box 87 a projection matrix is generated from all current τ except $\tau_i$ which corresponds to line 11. The box 88 ("Increase Resolution") corresponds to the "for" loop over the "step" vector in line 8. In the pseudocode this step vector contains step sizes of decreasing amounts, e.g. 100 ns, 30 ns, 10 ns, 3 ns, 1 ns, corresponding to an increase in resolution.

For comparison, in the following a pseudocode is shown for an algorithm of the alternate order.

```
procedure
  Points ← [τ_min : 1 : τ_max]        → Full-resolution global search
  for i ← 1 ... n do
    τ_i ← Search(C_h, Points, [τ_1, τ_2, ... τ_i])
    τ_i' ← 0
  end for
  loop
    for i ← 1 ... n do
      if | τ_j − τ_j' | ≤ ϵ , ∀ j ∈ {1 ... n} then
        return [τ_1, τ_2, ... τ_n]
      end if
      τ_i' ← τ_i
      τ_i ← Search(C_h, Points; [τ_1 , ... , τ_{i−1} , τ_{i+1} , ... , τ_n])   → Full-resolution global search
    end for
  end loop
end procedure
```

All variables here retain the same definitions as in the above example of the interleaved method. The new variable, $\tau_i'$, denotes the previously-found estimate of $\tau_i'$. This is caused by a different stopping criterion which was specified for this method.

The pseudocode of the alternating method explicitly carries out the unspecified maximization using a brute-force search. This can be done using the "Search" function used previously, but rather than passing a small subset of points to search, the entire window at the final desired resolution is passed. The primary difference between the interleaved algorithm and the alternate algorithm is how the search is performed. One other difference is present, but not rather significant. The stopping criterion in the alternate algorithm is convergence, when the estimated parameters no longer change very much. The interleaving algorithm stops after the smallest resolution search has made one pass. It would also be possible to change the stopping criterion from convergence to something like "repeat three times", so we do not consider the stopping criterion at all a distinguishing characteristic of either algorithm. On an interesting note, the stopping criterion of the alternate method can in principle also be used with the interleaving method, but would require a significant heavy modification.

Figure 10:
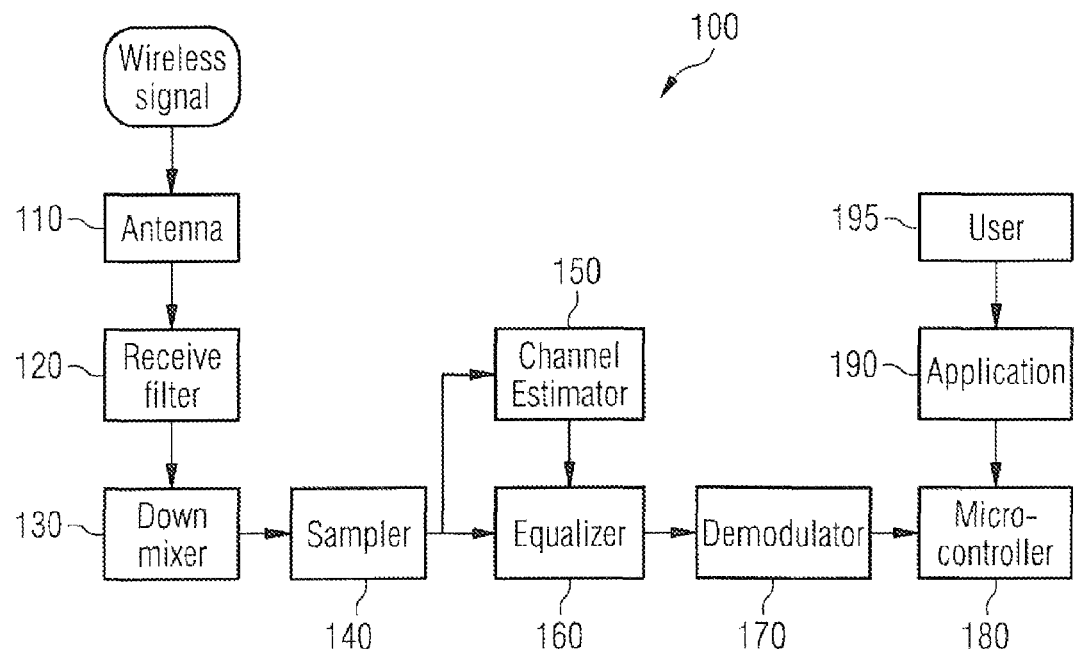
FIG. 10 illustrates a schematic block representation of a wireless communication system including a channel estimator.

FIG. 10 illustrates a schematic block representation of a wireless receiver system including a channel estimator as described in one or more of the examples or embodiments described herein before. The wireless receiver system 100 may comprise an antenna 110 for receiving a wireless signal. The antenna 110 may be configured to convert radio waves emitted by a base station into an electrical signal to be processed by the system. The antenna 110 may be further connected to a receive filter 120 which can be, for example, a pulse forming filter like, for example, a root raised cosine filter. An output of the receive filter 120 may be connected to a downmixer 130 which converts the signal from a carrier frequency to a baseband signal centered at 0 Hz. In mobile telephone communication systems the carrier frequency lies typically in a range from 1 to 2 GHz. An output of the downmixer 130 may be connected to a sampler 140 which samples the analog signal with a sampling rate and converts the sampled signal values from the analog to the digital domain. The digital values output by the sampler 140 may then be supplied to an equalizer 160 and also to a channel estimator 150. The channel estimator 150 in general estimates the distortions of the data signal applied by the channel and the system and the equalizer 160 attempts to undo these distortions. The channel estimator 150 can be configured according to any one of the examples or embodiments in this application or may have any one or more of the features or functions as described herein before. An output of the channel estimator 150 may be connected to the equalizer 160 to supply the estimate of h to the equalizer 160. An output of the equalizer 160 may be connected to a demodulator 170 which demodulates the signal according to the modulation scheme which was employed when transmitting the signal at the base station (for example PSK, phase shift keying). As a result the demodulator 170 converts the received signal into one or more (typically binary) data streams. An output of the demodulator 170 may be connected to a microcontroller 180, which is the main data processing unit in the system. The microcontroller 180 includes or is connected with an application software 190 which is currently being run on the system and can be handled by a user 195. The components 120-190 may be part of a receiver module, in particular may be integrated on a single chip having an antenna port connected to the antenna 110.

The above wireless communication system can be employed in any suitable kind of digital mobile or wireless communication systems like e.g. a tablet computer, a wireless mouse, a tire pressure monitoring system (TPMS), a digital radio or TV, Wi-Fi, etc.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

What is claimed is:

1. A method of channel estimation, comprising:
receiving a signal over a multi-path channel at a receiving port of a circuit;
generating a plurality of observation vectors of the received signal;
generating a channel covariance matrix of the plurality of observation vectors, wherein the channel covariance matrix is generated based upon a covariance matrix of a noisy vector and a noisy channel covariance matrix, wherein the noisy channel covariance matrix is generated based on a Hermitian transpose of the plurality of observation vectors, wherein generating the channel covariance matrix further comprises subtracting the covariance matrix of the noisy vector from the noisy channel covariance matrix; and
identifying a first path by projecting a pulse shaping vector on the channel covariance matrix at different time offsets and selecting the maximum of the projected channel covariance matrix with respect to the time offsets as the first path,
wherein the projecting the pulse shaping vector on the channel covariance matrix comprises multiplying a transposed pulse shaping vector with the channel covariance matrix by the pulse shaping vector.

2. The method according to claim 1, further comprising:
identifying a second path by projecting the pulse shaping vector into a null space of the first path at different time offsets and selecting the maximum thereof as a second path.

3. The method according to claim 2, wherein
determining the null space of the first path by defining a space which is orthogonal to the first path.

4. The method according to claim 2, further comprising:
determining the null space of the first path comprises generating a projection matrix being orthogonal to the first path.

5. The method according to claim 2, further comprising:
identifying the second path by the following equation:

$$\tau_2 = \operatorname*{argmax}_\tau tr\{r_p(\tau) r_p(\tau)^T \check{C}_{hh}\},$$

wherein $$r_p(\tau) = \frac{Pr(\tau)}{\|Pr(\tau)\|_2}$$

wherein $P = I_m - r(\tau_1) r(\tau_1)^T$, wherein tr{X} is the trace of the matrix X,
$r(\tau), r(\tau_1)$ are the pulse shaping vectors at time offsets $\tau, \tau_1$,
$I_m$ is the identity matrix, and $\check{C}_{hh} = \check{C}_{xx} - \check{C}_{ww}$, wherein $\hat{C}_{ww}$ is the covariance matrix of a noisy vector, and $\hat{C}_{xx}$ is the covariance matrix of a noisy channel given by $$\hat{C}_{xx} = \frac{1}{n} \sum_{i=1}^{n} x_i x_i^H,$$

wherein
$x_1, x_2, \ldots, x_n$ is a number n of observation vectors and H the Hermitian transpose.

6. The method according to claim 1, further comprising:
identifying the first path by the following equation:

$\tau_1 = \arg\max_\tau r(\tau)^T \check{C}_{hh} r(\tau)$, wherein $r(\tau)$ is the pulse shaping vector at offset $\tau$, and $\hat{C}_{hh}$ is the channel covariance matrix given by $$\hat{C}_{hh} = \hat{C}_{xx} - \hat{C}_{ww}, \text{ wherein}$$

$\hat{C}_{ww}$ is the covariance matrix of a noisy vector, and $\hat{C}_{xx}$ is the covariance matrix of a noisy channel given by $$\hat{C}_{xx} = \frac{1}{n} \sum_{i=1}^{n} x_i x_i^H,$$

wherein $x_1, x_2, \ldots, x_n$ is a number n of observation vectors and H the Hermitian transpose.

7. The method according to claim 1, further comprising:
identifying further paths, wherein in each case an n-th path is identified by projecting the pulse shaping vector into a null space of n-1 previously identified paths at different time offsets and the maximum thereof is selected as an n-th path.

8. The method according to claim 7, further comprising:
determining the null space of the n-1 previously identified paths by defining a space which is orthogonal to the n-1 previously defined paths.

9. The method according to claim 7, further comprising:
determining the null space of the n-1 previously identified paths comprises generating a projection matrix being orthogonal to the n-1 previously identified paths.

10. The method according to claim 7, further comprising:
identifying the n-th path by the following equation:

$$\tau_n = \operatorname*{argmax}_{\tau} tr\{r_p(\tau) r_p(\tau)^T \hat{C}_{hh}\},$$

wherein $$r_p(\tau) = \frac{Pr(\tau)}{\|Pr(\tau)\|_2}$$

wherein $$P = I_m - R(R^T R)^{-1} R^T, \text{ wherein}$$

$$R = [r(\tau_1) r(\tau_2) \ldots r(\tau_{n-1})], \text{ wherein}$$

$r(\tau_1), r(\tau_2), \ldots r(\tau_{n-1})$ are the pulse shaping vectors at time offsets $\tau_1, \tau_2, \ldots \tau_{n-1}$, $I_m$ is the identity matrix.

11. The method according to claim 7, further comprising:
in a first step identifying the first path and further paths and thereafter in a second step again identifying the first path and further paths by projecting the pulse shaping vector into a null space of all other identified paths.

12. The method according to claim 7, further comprising:
determining amplitudes of the identified paths by projecting the pulse shaping vector on a multi-path channel covariance matrix containing all identified paths.

13. The method according to claim 1, further comprising:
in a first step identifying the first path and the second path and thereafter in a second step again identifying the first path and further paths by projecting the pulse shaping vector into a null space of the identified second path.

14. The method according to claim 13, further comprising:
conducting the first step with a first time resolution; and conducting the second step with a second time resolution, wherein the first time resolution is lower than the second time resolution.

15. The method according to claim 13, further comprising:
conducting one or more of the first step and the second step by applying a logarithmic search.

16. A method, comprising:
receiving a signal over a multi-path channel at a receiving port of a circuit;
generating a channel covariance matrix of observation vectors of the received signal wherein the channel covariance matrix is generated based upon a covariance matrix of a noisy vector and a noisy channel covariance matrix, wherein the noisy channel covariance matrix is generated based upon a Hermitian transpose of the plurality of observation vectors, wherein generating the channel covariance matrix further comprises subtracting the covariance matrix of the noisy vector from the noisy channel covariance matrix;
identifying a first path by projecting a pulse shaping vector on the channel covariance matrix at different time offsets and selecting the maximum thereof as the first path; and
identifying a second path by projecting the pulse shaping vector into a null space of the first path at different time offsets and selecting the maximum of the projected channel covariance matrix with respect to the time offsets as the second path,
wherein the projecting the pulse shaping vector on the channel covariance matrix comprises multiplying a transposed pulse shaping vector with the channel covariance matrix by the pulse shaping vector.

17. A channel estimator, comprising:
an observation vector generator configured to generate a plurality of observation vectors of a received signal;
a channel covariance matrix estimator configured to generate a channel covariance matrix from the plurality of observation vectors by subtracting a covariance matrix of a noisy vector from a noisy channel covariance matrix, wherein the noisy channel covariance matrix is generated based upon a Hermitian transpose of the plurality of observation vectors; and
a path identifier configured to identify a first path by projecting a pulse shaping vector on the channel covariance matrix at different time offsets and to select the maximum of the projected channel covariance matrix with respect to the time offsets as the first path,
wherein the projecting the pulse shaping vector on the channel covariance matrix by the path identifier comprises multiplying a transposed pulse shaping vector with the channel covariance matrix by the pulse shaping vector.

18. The channel estimator according to claim 17, further comprising:
the path identifier being configured to identify a second path by projecting the pulse shaping vector into a null space of the first path at different time offsets and to select the maximum thereof as a second path.

19. The channel estimator according to claim 18, further comprising:
a projection matrix generator configured to generate a projection matrix being orthogonal to the first path.

20. The channel estimator according to claim 17, further comprising:
the path identifier being configured to identify further paths and being configured to identify an n-th path by projecting the pulse shaping vector into a null space of n-1 previously identified paths at different time offsets and to select the maximum thereof as an n-th path.

21. The channel estimator according to claim 20, further comprising:

a projection matrix generator being configured to generate a projection matrix being orthogonal to the n-1 previously identified paths.

22. The channel estimator according to claim 20, further comprising:
the path identifier being configured to determine amplitudes of the identified paths by projecting the pulse shaping vector on a multi-path channel covariance matrix containing all identified paths.

23. The channel estimator according to claim 17, further comprising:
the path identifier being configured in a first step to identify the first path and the second path and thereafter in a second step to identify the first path and further paths by projecting the pulse shaping vector into a null space of the identified second path.

24. The channel estimator according to claim 17, further comprising:
the path identifier being configured in a first step to identify the first path and further paths and thereafter in a second step to identify the first path and further paths by projecting the pulse shaping vector into a null space of all other identified paths.

25. The channel estimator according to claim 24, further comprising:
the path identifier being configured to conduct one or more of the first step and the second step by applying a logarithmic search.

26. The channel estimator according to claim 17, further comprising:
the path identifier being configured to conduct the first step with a first time resolution and to conduct the second step with a second time resolution, wherein the first time resolution is lower than the second time resolution.

27. A wireless receiver module, comprising:
an antenna port for receiving a signal; and
a channel estimator, the channel estimator comprising an observation vector generator configured to generate a plurality of observation vectors of a received signal, a channel covariance matrix estimator configured to generate a channel covariance matrix from the plurality of observation vectors by subtracting a covariance matrix of a noisy vector from a noisy channel covariance matrix, wherein the noisy channel covariance matrix is generated based upon a Hermitian transpose of the plurality of observation vectors, and a path identifier configured to identify a first path by projecting a pulse shaping vector on the channel covariance matrix at different time offsets and to select the maximum of the projected channel covariance matrix with respect to the time offsets as the first path,
wherein the projecting the pulse shaping vector on the channel covariance matrix by the path identifier comprises multiplying a transposed pulse shaping vector with the channel covariance matrix by the pulse shaping vector.

* * * * *